Patented Sept. 26, 1939

2,174,245

UNITED STATES PATENT OFFICE 2,174,245

COMPOUNDS OF THE ANTHRAQUINONE SERIES

Artur Krause and Robert Zell, Ludwigshafen-on-the-Rhine, Germany, assignors to General Aniline Works, Inc., New York, N. Y., a corporation of Delaware No Drawing. Application December 23, 1937, Serial No. 181,370. In Germany January 2, 1937

6 Claims. (Cl. 260—377)

The present invention relates to new compounds of the anthraquinone series.

We have found that new valuable compounds of the anthraquinone series are obtained by causing amines of the general formula:

wherein $R_1$ stands for an alkyl radical with at least 3 carbon atoms containing at least two hydroxyl groups and $R_2$ for hydrogen or an alkyl, aralkyl or aryl group or a radical of the constitution $R_1$ to act on anthraquinone derivatives of the general formula:

(wherein A stands for the radical of an anthraquinone, X for a primary or secondary amino group in alpha-position or a radical capable of conversion into the same, $n$ is a whole number smaller than five and Y is a carboxylic or sulphonic acid halide or ester group in beta-position) and converting any radicals present in the resulting acid amides which are capable of conversion into primary or secondary amino groups into such groups if desired.

Among compounds having the formula

there may be mentioned for example 1-amino-2,3-dihydroxypropane, glucamine, alkylglucamines and similar amines of the sugar series.

As anthraquinone derivatives of the general formula

there may be mentioned for example 1-nitroanthraquinone-2-carboxylic acid chloride, 1-chloranthraquinone-2-carboxylic acid chloride, 1-aminoanthraquinone-2-carboxylic acid chloride, 1-amino-4-nitroanthraquinone-2-carboxylic acid chloride, 1-amino-4-(para-toluenesulphamido)-anthraquinone-2-carboxylic acid chloride, 1,4-dichloranthraquinone-6-carboxylic acid chloride, 1,4-di-(para-toluenesulphamido)-anthraquinone-6-carboxylic acid chloride, 1-iodoanthraquinone-2-sulphonic acid chloride, 1,4-dichloranthraquinone-2-sulphonic acid chloride, 1,4-dichloranthraquinone-6-sulphonic acid chloride and 1,5-di-amino-2,6-dicarboxylic acid chloride.

The reaction is preferably carried out in the presence of water, an alcohol, pyridine or a diluent. An excess of the amine may, however, be used. In some cases, as for example when starting from acid halides having replaceable radicals, one or more of these radicals may be replaced by the radical of the amine of the formula

simultaneously with the formation of the acid amide.

The procedure may also be that following the reaction of the acid halide or ester with the amine, at least one of any radicals still present is converted into a primary or secondary amino group.

The compounds thus obtainable may be used with advantage for the preparation of dyestuffs. Some of them are themselves valuable dyestuffs for dyeing cellulose esters and ethers and generally speaking distinguished by good solubility in water. The dyeings obtained therewith are distinguished by great clarity and fastness.

The following examples will further illustrate how the said invention may be carried out in practice but the invention is not restricted to these examples. The parts are by weight.

Example 1

A suspension of 50 parts of 1-aminoanthraquinone-2-carboxylic acid chloride in a solution of 100 parts of methyl-glucamine in 200 parts of water is heated to boiling. A red-yellow solution is thus formed after a short time. By cooling, the 1-aminoanthraquinone-2-carboxylic acid methyl glucamide formed separates in the form of red-yellow needles which are isolated in the usual manner. The new compound dissolves in warm water readily to give a red-yellow coloration and yields clear red-yellow dyeings on acetate artificial silk. It dissolves in strong sulphuric acid giving a pale yellow coloration which changes to blue-violet upon the addition of trioxymethylene.

If the methylglucamine be replaced by 1-amino-2,3-propane-diol, a similar dyestuff is obtained which is somewhat less soluble in water.

*Example 2*

A suspension of 50 parts of 1-nitroanthraquinone-2-carboxylic acid chloride in a solution of 100 parts of 1-amino-2,3-propane-diol in 300 parts of water is heated to boiling. After a short time, a deep red solution forms from which the 1-propane-diol-aminoanthraquinone-2-carboxylic acid propane-diol-amide formed separates on cooling. It dissolves in strong sulphuric acid giving a red coloration, very readily in warm water, also giving a red coloration, and dyes acetate artificial silk salmon-red shades.

*Example 3*

A mixture of 55 parts of 1-amino-4-nitroanthraquinone-2-carboxylic acid chloride, 30 parts of 1-amino-2,3-propane-diol and 120 parts of water is heated at 70° C. while stirring until the compact yellow crystals of the initial material have been completely converted into fine yellow-red needles. The latter are filtered off after cooling and washed with cold water. The 1-amino-4-nitroanthraquinone-2-carboxylic acid propane-diol-amide thus obtained is soluble in water with comparative difficulty. If the nitro group be reduced in known manner, as for example by treatment with sodium sulphide solution or by vatting, a blue dyestuff which is readily soluble in warm water is obtained which dyes acetate artificial silk powerful reddish blue shades of excellent fastness. It dissolves in strong sulphuric acid giving a pale yellowish coloration which changes to greenish blue upon the addition of trioxymethylene.

A similar dyestuff is obtained by causing 1-amino - 4 - para - toluenesulphamido-anthraquinone-2-carboxylic acid chloride to react in the said manner with aminopropane-diol and splitting off the para-toluene sulphonic acid radical in known manner.

If the aminopropane-diol be replaced by glucamine, a very similar blue acetate artificial silk dyestuff is obtained.

*Example 4*

A suspension of 50 parts of 1-amino-4-hydroxyanthraquinone-2-carboxylic acid chloride in 50 parts of 1-amino-2,3-propane-diol and 150 parts of water is heated for 2 hours at from 80° to 90° C. The 1-amino-4-hydroxyanthraquinone-2-carboxylic acid propane-diol-amide which crystallizes out upon cooling is readily soluble in warm water giving a violet coloration and yields powerful violet dyeings on acetate artificial silk.

*Example 5*

A mixture of 10 parts of 1,4-dichloranthraquinone-6-sulphonic acid chloride and 40 parts of 1-amino-2,3-propane-diol is heated at 40° C. while stirring until when a sample is withdrawn and diluted with hot water only a trace at the most remains undissolved. The reaction mixture is then mixed with 150 parts of hot water, filtered by suction and the compound formed salted out. It dissolves readily in warm water giving a red coloration and dyes acetate artificial silk red shades.

*Example 6*

A mixture of 10 parts of 1,4-dichloranthraquinone-6-carboxylic acid chloride and 40 parts of 1-amino-2,3-propane-diol is stirred at from 50° to 60° C. until a sample withdrawn dissolves in hot water without any appreciable residue. The mixture is worked up by dilution with hot water, filtration by suction and salting out of the compound formed in the usual manner. It dissolves in warm water giving a red coloration and dyes acetate artificial silk clear red shades.

*Example 7*

A suspension of 20 parts of 1-nitroanthraquinone-2-carboxylic acid methyl ester in a mixture of 80 parts of butanol and 49 parts of 1-amino-2,3-propane-diol is heated for several hours at 115° C. while stirring. When the reaction is completed the butanol is removed by steam and the 1-propanediol - aminoanthraquinone - 2 -carboxylic acid propane-diol amide formed is separated from the red solution in the manner described in the foregoing examples.

What we claim is:

1. An anthraquinone derivative of the general formula

wherein A represents the radical of an anthraquinone, X stands in an alpha-position and represents a group

$R_1$ and $R_2$ being selected from the class consisting of hydrogen and alkyl, and Y stands in a beta-position and represents an amide group selected from the class consisting of

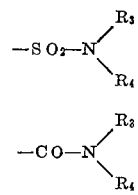

wherein $R_3$ stands for a member selected from the class consisting of hydrogen and alkyl, and $R_4$ for an alkyl group having at least two hyroxyl groups, $n$ being a whole number up to four.

2. An anthraquinone derivative of the general formula

wherein A represents the radical of an anthraquinone, X stands in an alpha-position and represents a group

$R_1$ and $R_2$ being selected from the class consisting of hydrogen and alkyl and Y stands in a beta-position and represents a group

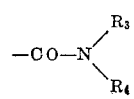

wherein $R_3$ stands for a member selected from the class consisting of hydrogen and alkyl, and $R_4$ for an alkyl group having at least two hydroxyl groups, $n$ being a whole number up to four.

3. An anthraquinone derivative of the general formula

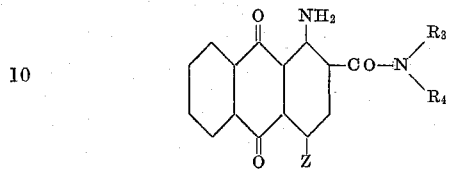

wherein $R_3$ stands for a member selected from the class consisting of hydrogen and alkyl, $R_4$ for an alkyl group having at least two hydroxyl groups, and Z for a member of the group consisting of H, —OH and

$R_1$ and $R_2$ being selected from the class consisting of hydrogen and alkyl.

4. The anthraquinone derivative of the formula

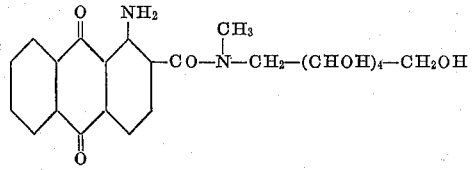

5. The anthraquinone derivative of the formula

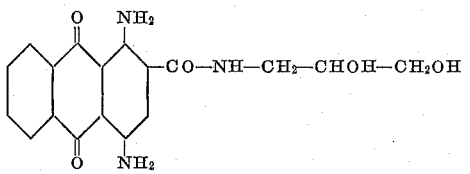

6. The anthraquinone derivative of the formula

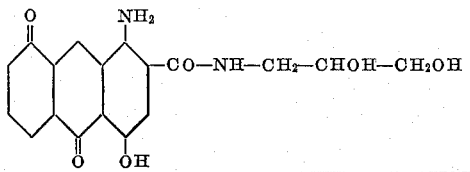

ARTUR KRAUSE.
ROBERT ZELL.